United States Patent [19]

Shaw

[11] 3,786,882

[45] Jan. 22, 1974

[54] BUOYANCY WEIGHING SCALES

[75] Inventor: John Shaw, Winterbourne Down, England

[73] Assignee: Glevum Industrial Designers Limited, Gloucester, England

[22] Filed: July 24, 1972

[21] Appl. No.: 274,245

[30] Foreign Application Priority Data
July 22, 1971   Great Britain .................... 34331/71

[52] U.S. Cl..................... 177/114, 177/207, 73/309
[51] Int. Cl. ........................ G01g 13/24, G01g 5/02
[58] Field of Search. 177/47, 60, 64, 114, 116, 207; 73/296, 313, 309

[56] References Cited
UNITED STATES PATENTS
2,626,042   1/1953   Aldridge .......................... 177/207 X
2,634,120   4/1953   Ouaida ............................... 177/207

Primary Examiner—George H. Miller, Jr.
Attorney, Agent, or Firm—Irvin S. Thompson et al.

[57] ABSTRACT

A balance designed for use in dialysis apparatus includes a float within a container for a liquid. A vessel for treatment solution is connected to the float so that the float moves in dependence on the mass of solution in the vessel. Movement of the float is determined by sensing the level of liquid in a U-tube which communicates with the container.

6 Claims, 3 Drawing Figures

BUOYANCY WEIGHING SCALES

BACKGROUND OF THE INVENTION

1. Field of the Invention

This invention relates to balances.

2. Description of the Prior Art

Balances at present in use normally comprise either pivoted lever systems or springs which extend under load. It is an object of the invention to provide a balance which is dependent for its action on liquid displacement.

SUMMARY OF THE INVENTION

A balance comprises a float in a container for a liquid, means for loading the float with the weight to be measured and means for sensing the level of the liquid in the container. The sensing means is preferably such as to produce a signal when a predetermined loading is attained. The level is sensed by means including a zero-setting facility, such setting being obtained using a level sensing element fixed to a graduated scale.

DESCRIPTION OF THE PREFERRED EMBODIMENTS

Figure 1:
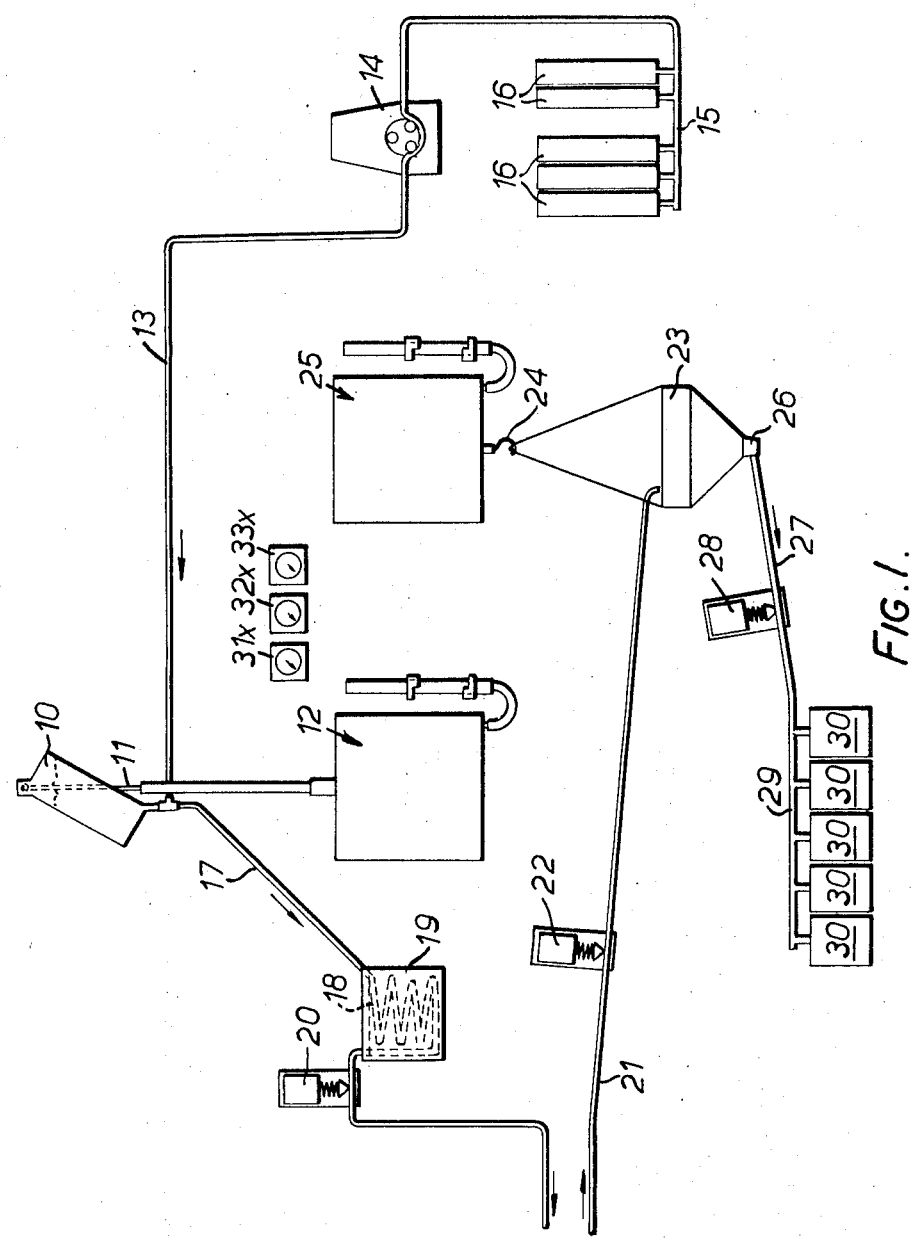
FIG. 1 is a generally diagrammatic view of a dialysis machine.

The dialysis machine shown in FIG. 1 includes a container 10 which is pivotally mounted on the upper end of a rod 11 forming part of a first buoyancy balance 12. The container 10 is connected by a line 13 including a pump 14 to a manifold 15, the manifold communicating with a battery of storage containers 16. The container 10 has a T-junction connected thereto from which extends an outlet line 17 which includes a coil 18 contained within an electrically heated bath 19 for raising the temperature of the treatment solution, the coil 18 communicating with an inflow solenoid valve 20 which, when open, allows solution heated within the bath to flow to the patient. That portion of the outlet line 17 between the T-junction and the inflow valve 20 is permanently filled with the treatment solution to prevent air bubbles passing to the patient.

The contaminated solution from the patient passes along a line 21 containing an outflow solenoid valve 22, the line 21 leading to a weighed drainage vessel 23 which is suspended from a hook 24 forming part of a second buoyancy balance 25. The drainage vessel 23 has an outlet 26 through which the contaminated solution can pass along a line 27 containing a discharge solenoid valve 28 to a manifold 29 connected to waste reservoirs 30.

The machine includes three timers 31x, 32x and 33x by means of which, in cooperation with contacts operated by the two balances 12 and 25, a predetermined time sequence can be set up for the inflow of a specified quantity of sterile treatment solution, for a predetermined dwell period and for outflow of a quantity of contaminated solution measured for comparison with the outflow quantity and usually equated thereto. The three timers 31x, 32x and 33x have adjustable contacts for setting the three time periods and each of the balances has a pair of adjustable contacts (as described hereinafter in more detail with reference to FIGS. 2 and 3), one of which operates as a zero setting and the other operates to set a measured quantity of solution. The adjustable contacts of the balances 12 and 25 can be in the form of microswitches but may take the form of other sensor means, including, for example, photoelectric cells.

When the machine has been set up, i.e., the zero settings have been made and the balance contacts have been adjusted to the required quantities of treatment solution, a switch is operated to initiate the cycle of operations of the machine. During the inflow portion of the cycle, the valve 20 in outlet line 17 is closed and the motor of the pump 14 is energised so that the sterile solution flows from the storage containers 16 to the suspended container 10. When the weight of solution pumped into the container 10 reaches the set value, the limit contact on balance 12 closes, causing switching off of the pump motor and a set inflow contact of the timer 31x then operates to open the valve 20 in outlet line 17 whereby the treatment solution can flow along the line 17 through the coil 18, through the open inflow solenoid valve 20 to the patient. This flow of solution continues until the whole of the weighed amount of solution has been absorbed by the patient, the amount of solution which passes to the patient being recorded by recording means (not shown). When the set amount of solution has flowed to the patient and the container 10 is empty, the zero setting contact closes in readiness to repeat the inflow cycle when signalled to do so by the timer 31x. Should there have been any restriction to the inflow during this part of the cycle, the amount of solution in the container 10 will not have fallen to zero by the time that the timer 31x has run through a set portion of its cycle and, under such conditions, an alarm will be given to call for remedial action to be taken, for example, to remove a blockage in the line 17.

A dwell period then follows during which the treatment solution remains in the patient, the length of the dwell period being determined by the setting of timer 32x and, during this dwell period, all the valves of the machine are closed.

On completion of the dwell period, a signal is transmitted from timer 32x to timer 33x and the outflow solenoid valve 22 opens to allow the now-contaminated solution to flow from the patient to the draining vessel 23. When the required amount of solution has drained into the vessel 23, contacts on balance 25 are operated and drainage is checked and recorded, after which the valve 28 to the waste manifold 29 is opened to allow the contaminated solution to flow to the reservoirs 30. In certain circumstances, for example, when the outflow fluid is highly contagious, the reservoirs 30 may be by-passed and the outflow fluid may be fed straight into a sluice.

When the discharge vessel is empty, the solenoid valve 28 is closed by operation of the zero-setting contacts on the balance 25 in readiness for a further cycle of operations. Means are provided associated with the timer 33x whereby, in the event that any fluid should remain in the vessel 23 when the timer has run through a predetermined cycle, an alarm will be given so that any restriction to the outflow of the treatment solution can be removed.

Figure 2:
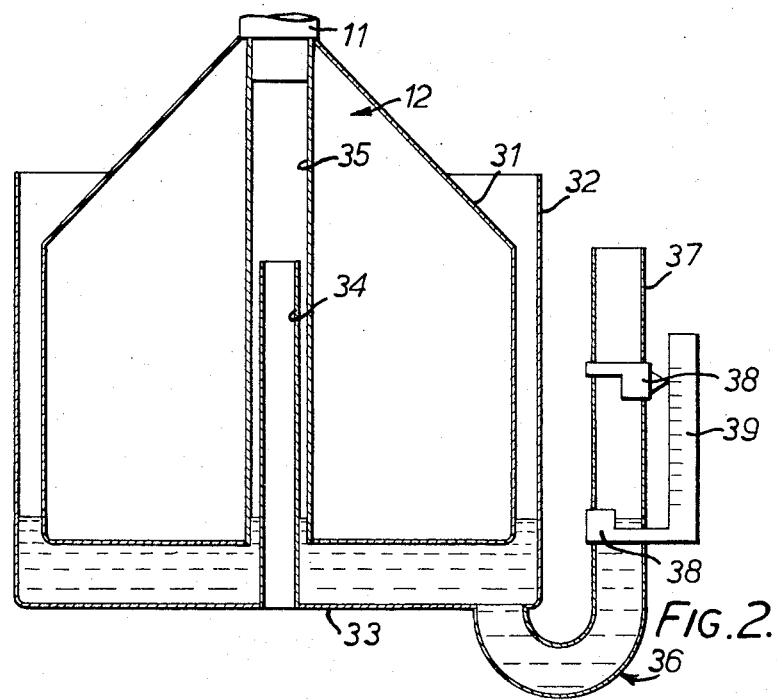
FIG. 2 is a sectional view of a first form of buoyancy balance.

The balance 12 shown in detail in FIG. 2 includes the rod 11, the lower end thereof being connected to a float 31 contained within a generally cyclindrical chamber 32. The chamber 32 has a planar bottom wall 33 at the centre of which there is fixed an upstanding guide 34 which enters a central vertical aperture in the float 31, such aperture being formed by the bore of a tube 35. An eccentrically disposed opening is formed in the bottom wall 33 for connection of a U-tube 36 to the chamber 32, the U-tube 36 having a longer vertical arm 37 alongside the chamber 32 which cooperates with a pair of photoelectric cell/receiver combinations 38 to provide a pair of level settings. The lower cell-/receiver combination 38 provides a zero setting and is set so that the light beam is just interrupted by the level of liquid in the tube, the liquid being opaque and a scale 39 being fixed to the photoelectric cell. A pointer is associated with the upper photoelectric cell/receiver combination, the markings on the scale being such as to give an indication of the weight of treatment solution fed into the container 10. The combination of the scale 39 and the lower photoelectric cell is fixed in position so that the beam of light is, as mentioned above, just interrupted by the liquid in the tube. When the weighing operation is effected the level of liquid of the tube 36 will rise and, when the level is steady, the upper cell-/receiver combination is adjusted so that the light beam is then just interrupted by the level of liquid in the tube. The pointer which moves over the scale 39 will then give an indication of the change in height of liquid and, if desired, the graduations of the scale 39 may be such as to give a direct reading of the weight then attached to the balance.

Figure 3:
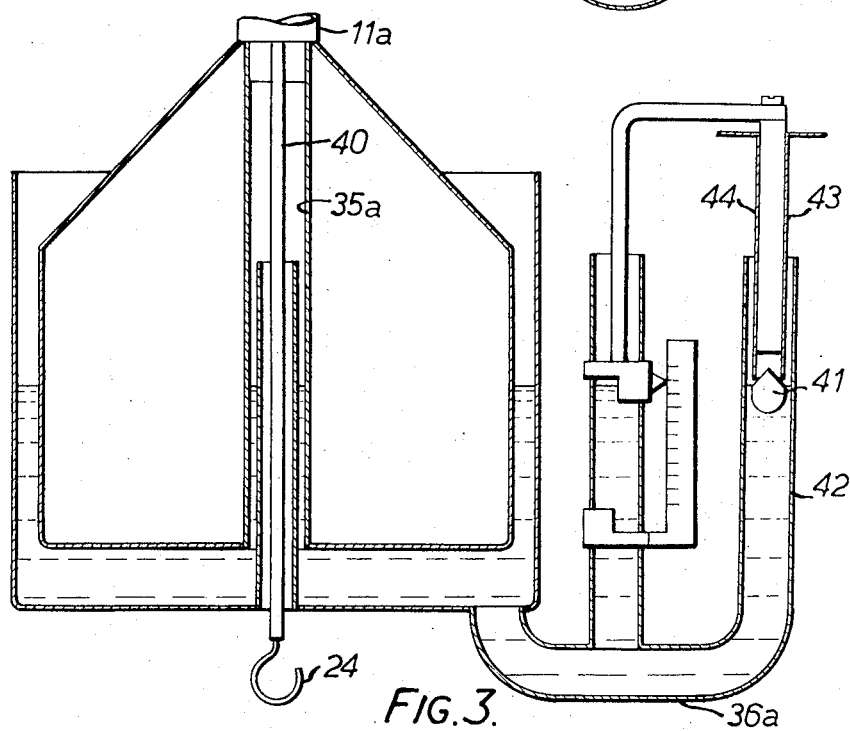
FIG. 3 is a sectional view of a second form of buoyancy balance.

In the alternative form of buoyancy balance shown in FIG. 3, like reference numerals with the addition of the suffix $a$ are employed to indicate parts which correspond to those shown in FIG. 2. The rod 11a has a stem 40 attached to it, the stem 40 carrying the hook 24 at its lower end on which the vessel 23 is suspended. The U-tube 36a of FIG. 3 is provided with an additional branch or limb 42, this being to afford a fail-safe facility. The fail-safe facility is provided by positioning a metal float 41 in the branch 42 with the metal float 41 arranged so that it will complete a circuit between a pair of terminal members 43 and 44 to operate an alarm and to close the appropriate valve 22 to prevent overfilling of the vessel 23. The fail-safe facility shown in FIG. 3 can be employed in the balance shown in FIG. 2 and will then serve to de-energise the pump when the float reaches the level of the terminals 43 and 44. The liquid employed in each buoyancy balance may be water containing a dye or it may be a suitable heavy oil.

The container 10 is formed of a rigid synthetic plastics material and is replaceable. A sterile container 10 is taken from a store and connected to the inlet and outlet lines 13 and 17 which are conveniently of polyvinylchloride. The container 10 is conveniently provided adjacent its upper end with an air inlet/vent filter. In an alternative arrangement the rigid container is replaced by a flexible bag of synthetic plastics material, the bag being replaceable and provided in an initially sterile condition for connection to the inlet and outlet lines 13 and 17.

I claim:

1. A balance comprising a float in a container for a liquid, means for loading a float with a weight to be measured, and means for sensing the level of liquid in a U-tube which communicates with the container, said sensing means including a graduated scale which is fixed relative to a first sensor element and a second sensor element which is movable relative to the fixed scale.

2. A balance according to claim 1, wherein each of said sensor elements comprises a photoelectric cell-/receiver combination and wherein the liquid is an opaque liquid.

3. A balance according to claim 1, wherein a member is fixed to the float so as to project therefrom, said member terminating in a support for a body to be weighed, the projecting member extending upwardly relative to the container and the support comprising a pivot mounting adjacent the upper end of said member.

4. A balance according to claim 1, wherein the float is of annular form in horizontal cross-section and wherein a hollow cylindrical guide extends upwardly from the base of the container, said annular float fitting around said hollow cylindrical guide and a member projecting downwardly through said hollow guide being fixed to the float with a formation at the lower end of said member for attachment of an article to be weighed to the float.

5. A balance according to claim 1, wherein the U-tube is provided with an additional branch, said additional branch containing means providing a fail-safe facility.

6. A balance according to claim 5, wherein the means for providing a fail-safe facility includes a metal float arranged to bridge a connection between a pair of terminal members to operate an alarm in response to the level of liquid in the U-tube attaining a predetermined value.

* * * * *